United States Patent
Kump

(10) Patent No.: US 6,236,492 B1
(45) Date of Patent: May 22, 2001

(54) ELECTRODE WITH A BALANCED CENTROID, SOFT EDGES AND AN APODIZATION RATIO GREATER THAN ONE

(75) Inventor: John D. Kump, Hillsborough, CA (US)

(73) Assignee: Crystal Corporation, Palo Alto, CA (US)

( * ) Notice: Subject to any disclaimer, the term of this patent is extended or adjusted under 35 U.S.C. 154(b) by 0 days.

(21) Appl. No.: 09/368,306

(22) Filed: Aug. 3, 1999

(51) Int. Cl.[7] ............................ G02B 26/00; H01L 41/04; H01L 41/08
(52) U.S. Cl. ............................. 359/295; 310/367
(58) Field of Search ........................ 359/295; 365/230.8; 310/334, 364, 367, 369, 370, 371

(56) References Cited

U.S. PATENT DOCUMENTS

| | | | | |
|---|---|---|---|---|
| 4,513,261 | * | 4/1985 | Yen et al. | 333/194 |
| 4,516,838 | | 5/1985 | Bademian | 365/230.08 |
| 5,889,355 | * | 3/1999 | Shah | 310/334 |

OTHER PUBLICATIONS

Frank Ingenito and Bill D. Cook, Theoretical Investigation of the Integrated Optical Effect Produced by Sound Fields Radiated from Plane Piston Transducers, *The Journal of the Acoustical Society of America*, vol. 45, No. 3, 1969, pp. 572–577.

Bill Cook, Eduardo Cavanagh, Henry D. Dardy, A Numerical Procedure for Calculating the Integrated Acoustooptic Effect, *IEEE Transactions on Sonics and Ultrasonics*, vol. 5. SU–27, No. 4, Jul. 1980, pp. 202–207.

Bill D. Cook, A Procedure for Calculating the Integrated Acousto–Optic (Raman–Nath) Parameter for the Entire Sound Field, *Ultrasonics Symposium*, 1979, pp. 90–90.

* cited by examiner

Primary Examiner—Ricky Mack
(74) Attorney, Agent, or Firm—Fish & Richardson P.C.

(57) ABSTRACT

An electrode has an apodization ratio greater than one along a direction parallel to an interaction length of the electrode. The electrode also has a top edge defined by an aperture function Y(x). The aperture function Y(x) has no points of discontinuity along the interaction length of the electrode. An area centroid of the electrode is at a midpoint of the interaction length.

25 Claims, 3 Drawing Sheets

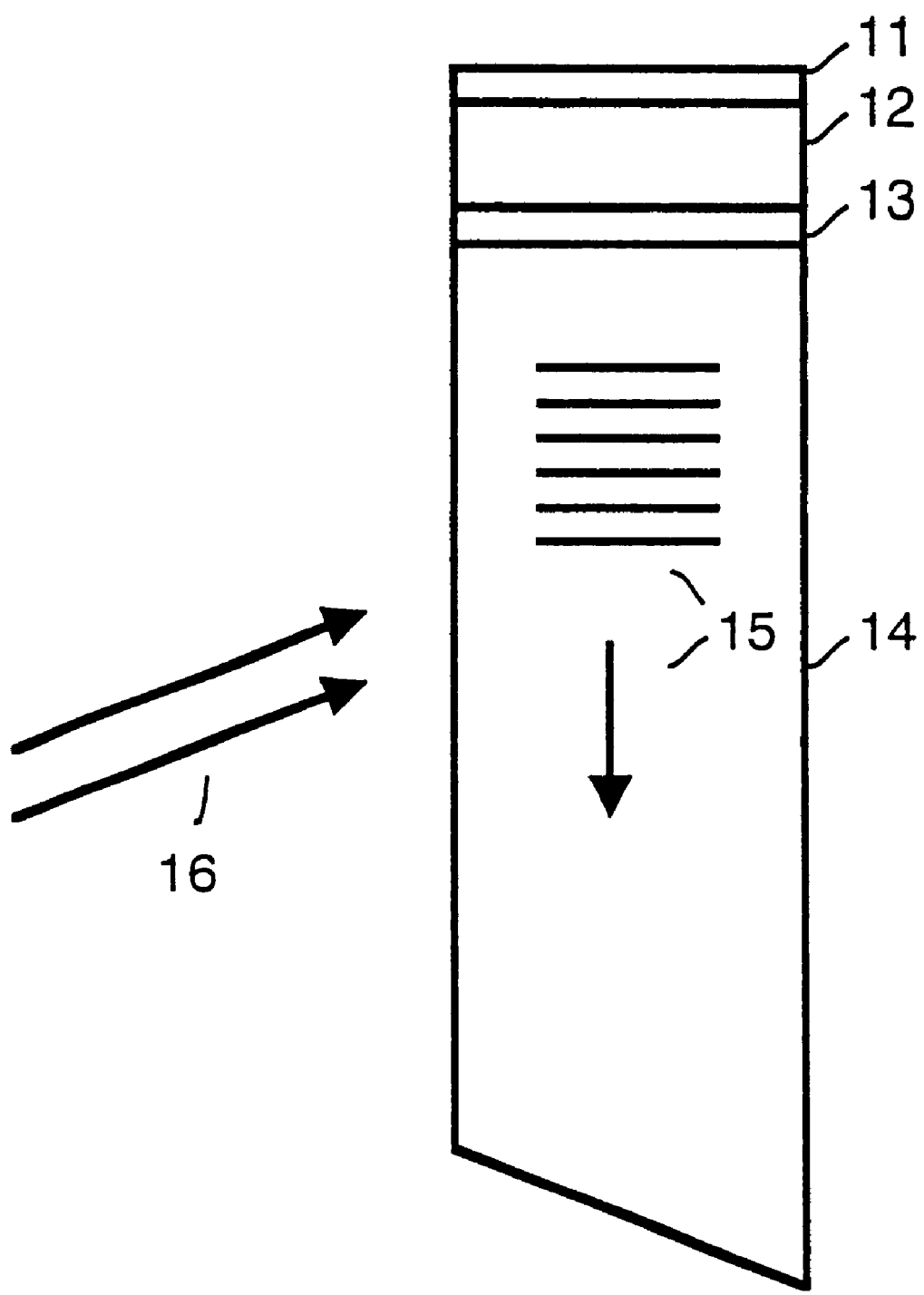
FIG._1

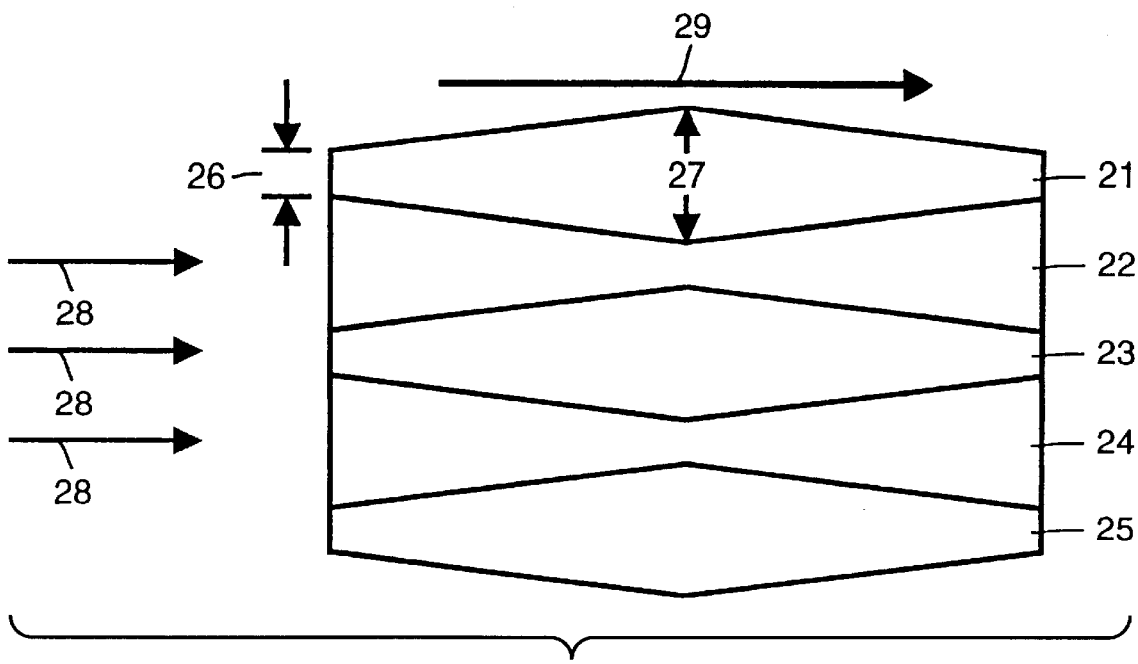
FIG._2 (PRIOR ART)
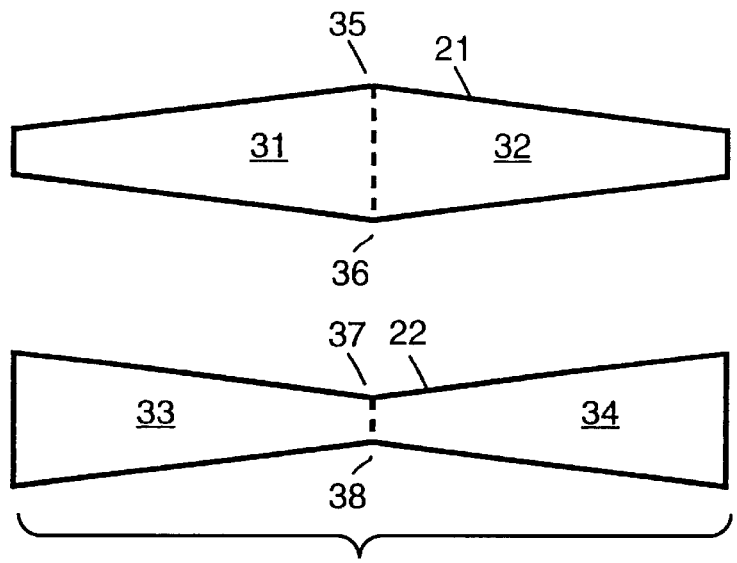
FIG._3 (PRIOR ART)
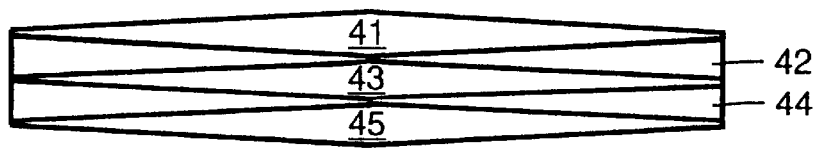
FIG._4 (PRIOR ART)

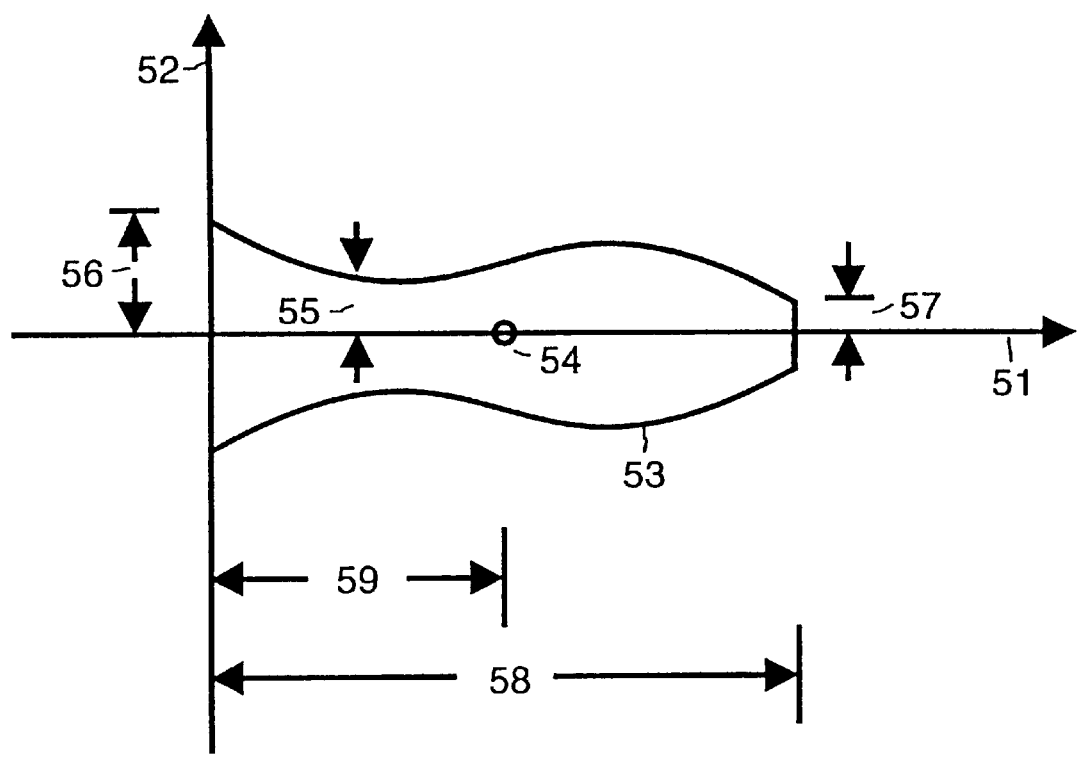
FIG._5
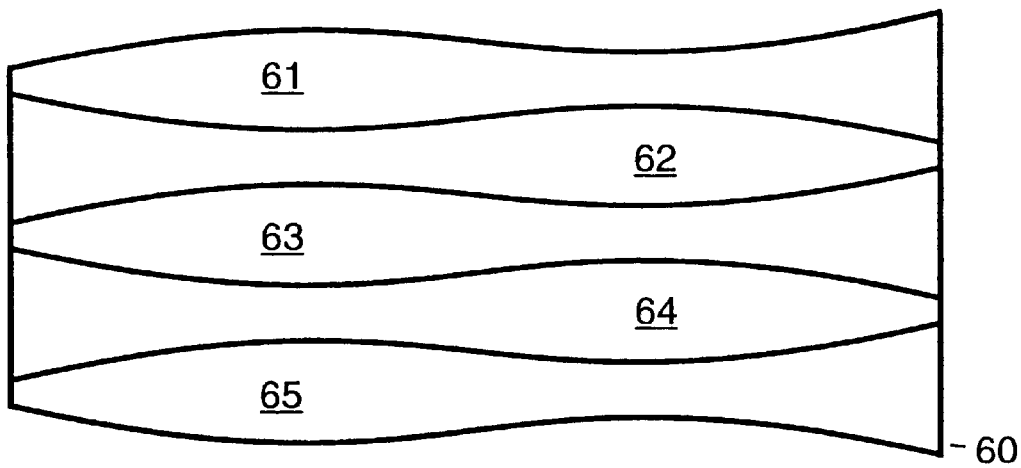
FIG._6

ELECTRODE WITH A BALANCED CENTROID, SOFT EDGES AND AN APODIZATION RATIO GREATER THAN ONE

BACKGROUND

1. Field of the Invention

The present invention pertains to the design of electrodes for applications such as in the field of acousto-optics and pertains particularly to an electrode that has a balanced centroid, soft edges and an apodization ratio greater than one.

2. Related Information

Acousto-optic (AO) devices are based on the photoelastic effect of certain crystals. The crystals are designed so that sound waves change the optical properties of the crystals. Sound waves are injected into a crystal typically using piezo-electric transducers. As the crystal propagates the sound waves, areas of compression and rarefraction change the optical properties of the crystal. Light transmitted through the crystal is then deflected modulated and/or frequency shifted as the light travels through the crystals. Changes in the optical properties of the crystal result from the change in index of refraction caused by the strain produced by the sound waves. For a good general discussion of acousto-optic devices, see Akis P. Goutzoulis, Dennis R. Pape, *Design and Fabrication of Acousto-Optic Devices*, Marcel Dekker, Inc., New York, N.Y., 1994.

Piezo-electric transducers are formed by placing piezo-electric materials between a top electrode and a bottom electrode. Multiple electrodes can be used to create multi-channel devices. In some designs it is desirable to nest an array of electrodes to produce overlapping sound fields. Such arrays of electrodes are often composed of apodized electrodes. An apodized electrode is an electrode whose height varies over the interaction length of the electrode. The apodization ratio of an electrode is the maximum height of the electrode divided by the minimum height of the electrode.

When used in acousto-optical applications, it is generally the rule that light encounters an acousto-optical crystal traveling in a direction parallel to the interaction length of an electrode, and perpendicular to the height of the electrode. The centroid of an electrode is the center of mass of the electrode.

In the prior art, apodized electrodes have been developed so that the area centroid of the electrode occurs at the midpoint of the interaction length of the electrode. However in order to achieve this, such prior-art electrodes have a shape that is basically the sum of two primitive shapes, typically two trapezoids. When two trapezoids are joined together to form a common shape, the slope of the edge of the common shape at the intersection point of the two trapezoids is discontinuous.

SUMMARY OF THE INVENTION

In accordance with the preferred embodiment of the present invention, an electrode is set out that has an apodization ratio greater than one along a direction parallel to an interaction length of the electrode. The electrode also has a top edge defined by an aperture function Y(x). The aperture function Y(x) has no points of discontinuity along the interaction length of the electrode. An area centroid of the electrode is at a midpoint of the interaction length of the electrode.

The present invention allows design of electrodes which have a single primitive shape with edges having a continuous first and second derivative throughout the entire interaction length. This allows for 'soft' edges for sound field profiling while maintaining the area centroid at the midpoint of the interaction length.

BRIEF DESCRIPTION OF THE DRAWINGS

FIG. 1 shows the general layout of an acousto-optic device.

FIG. 2, FIG. 3 and FIG. 4 show examples of prior art electrode shapes.

FIG. 5 show an electrode shaped in accordance with a preferred embodiment of the present invention.

FIG. 6 shows an array of nested electrodes shaped in accordance with a preferred embodiment of the present invention.

DESCRIPTION OF THE PREFERRED EMBODIMENT

The present invention concerns an electrode design which is optimal for acousto-optic interaction. As will be clear from the described embodiments of the present invention, an electrode can be fashioned which has an area centroid at the midpoint of the interaction length. In addition, there is a large dynamic range of the electrode height apodization, soft edges for sound field profiling, and the capability to nest an array of electrodes into over-lapping sound fields. In one preferred embodiment of the present invention, a discreet aperture function is used to define the electrode shape in terms of the interaction length (L), of the electrode, the maximum height (H) of the electrode and the apodization ratio (R) of the electrode.

FIG. 1 shows a side view of an acousto-optic device having an acousto-optic crystal 14, piezo-electric material 12, top electrode(s) 11 and bottom electrode(s) 13. The electrodes are separated by the thickness of the piezo-electric material 12. Sound waves, represented by lines and arrow 15, are generated by piezo-electric material 12 in response to a signals across top electrodes) 11 and bottom electrode(s) 13. Arrows 16 represent incident optical beams being transmitted toward acousto-optic crystal 14. The index of refraction throughout acousto-optic crystal 14 varies based on the sound waves generated by piezo-electric material and propagated through acousto-optic crystal 14. The sound waves can be used to control what portion of the incident optical beams are diffracted as the optical beams travel through acousto-optic crystal 14.

The shape of the electrodes influences the shape of sound waves propagating through acousto-optic crystal 14.

For example, FIG. 2 shows a top view of an array of nested electrodes in accordance with the prior art. The array of nested electrodes includes an electrode 21, an electrode 22, an electrode 23, an electrode 24 and an electrode 25. The array of nested electrodes is on top of an acousto-optic crystal. Arrows 28 represent the direction of travel of incident optical beams. The optical beams, upon entering the acousto-optic crystal travel through (or are reflected away) the acousto-optic crystal.

An interaction length of each electrode runs parallel to an arrow 29 shown in FIG. 2. An apodization ratio of electrode 21 may be computed by dividing a maximum height 27 of electrode 21 by a minimum height 26 of electrode 21.

The electrodes shown in FIG. 2 each have an area centroid at the midpoint of the interaction length. However each of the electrodes shown in FIG. 2 is basically the sum of two primitive shapes.

For example, FIG. 3 shows that the shape of electrode 21 is the sum of a trapezoid 31 and a trapezoid 32. The shape of electrode 22 is the sum of a trapezoid 33 and a trapezoid 34. Where the trapezoids intersect, the slope of the edge is discontinuous. This is disadvantageous for sound field profiling.

Particularly, for electrode 21, at a point 35 and at a point 36, the edges of trapezoid 31 and trapezoid 32 intersect. Thus, at point 35 and point 36, the slope of the edge of electrode 21 is discontinuous. This is disadvantageous for sound field profiling. Likewise, for electrode 22, at a point 37 and at a point 38, the edges of trapezoid 33 and trapezoid 33 intersect. Thus, at point 37 and point 38, the slope of the edge of electrode 22 is discontinuous. This is disadvantageous for sound field profiling.

Another significant drawback to the electrode design shown in FIGS. 2 and 3 occurs when the apodization ratios of the electrodes are increased to produce overlapping sound fields.

This is illustrated by FIG. 4. In FIG. 4, electrode 41, electrode 42, electrode 43, electrode 44 and electrode 45 each have a very high apodization ratio. Electrodes 42 and 44 are in the shape of a bow-tie. As the apodization ratio for electrodes of this shape are increased, the height of the mid-section decreases. This decrease in cross-sectional area introduces a finite electrical resistance between the two primitive trapezoid shapes proportional to the apodization ratio. Theoretically if the apodization ratio were increased to infinity so would the electrical resistance between the two trapezoids which form these bow tie electrodes. This effect, in applications requiring multi-channel acousto-optic behavior, can degrade performance of the acousto-optic device.

Specifically, in multi-channel acousto-optic devices, the electrical interconnect to the electrodes plays an important role, not only to the desired acousto-optic performance but also to size and cost. For simplicity sake, to electrically connect to an electrode in a multi-channel array of electrodes, it is desired to make the connection to one end or the other of the electrode's interaction length. This is usually done in an alternating fashion advancing from one electrode to the next. This is called a single-ended drive scenario. It is the least complex of all multichannel electrical interconnect schemes.

Bow-tie shaped electrodes such as electrodes 42 and 44 shown in FIG. 4, have a limited dynamic range for apodization ratio that may be used for a single-ended drive. The generated acoustic energy of each trapezoid will differ by the finite electrical resistance effect discussed above. In practice, the acoustic energy generated from diamond-shaped electrodes 41, 43 and 45 will be out of balance with the acoustic energy generated by bow tie-shaped electrodes 42 and 44. This asymmetry in the generated acoustic energy limits the effectiveness of the electrode array.

FIG. 5 show an electrode 53 shaped in accordance with a preferred embodiment of the present invention. Electrode 53 is composed of a single primitive shape with edges having a continuous first and second derivative throughout the entire interaction length, thus providing 'soft' edges for sound field profiling. An area centroid 54 of electrode 53 occurs at the midpoint of an interaction length 58 of electrode 53. That is, a length 59 from the beginning of the interaction length of electrode 53 and ending at area centroid 54 is equal to one half of interaction length 58. Interaction length 58 of electrode 53 runs along an x axis 51. The height of electrode 53 is measured parallel to a y axis 52.

Electrode 53 is symmetrical around x-axis 51. Thus the apodization ratio of electrode 53 may be calculate by dividing height 56 (representing half the maximum height of electrode 53) by height 57 (representing half the minimum height of electrode 53).

Along the interaction length of electrode 53, an aperture function Y(x) is used to define an aperture 55 from x-axis to the top edge of electrode 53. In one preferred embodiment of the present invention the aperture function Y(x) has the form of sin(x). For example, the upper edge of electrode 53 is defined by the aperture function set out in Equation 1 below:

$$Y(x) = \frac{H}{2}\left[1 - \frac{R-1}{R*L}\left(x + \frac{\pi*L}{6}*\sin\left(\frac{2\pi*x}{L}\right)\right)\right] \quad \text{Equation 1}$$

The lower edge of electrode 53 is a mirror image of the upper edge of electrode 53. Thus, the lower edge of electrode 53 is defined by the aperture function Y(x) set out in Equation 2 below:

$$Y(x) = (-1)\frac{H}{2}\left[1 - \frac{R-1}{R*L}\left(x + \frac{\pi*L}{6}*\sin\left(\frac{2\pi*x}{L}\right)\right)\right] \quad \text{Equation 2}$$

The electrode shape described by Equations 1 and 2 has soft-edges and is apodized along the interaction length. When the apodization ratio approaches infinity, the electrode can nest in an array and still be driven from a single-ended electrical interconnect without affecting the sum of radiated acoustic energy from the array. Each electrode in an array can be driven from either side. In addition the area centroid for each electrode occurs at the midpoint of the interaction length.

However, other aperture functions can be utilized which accomplish the same goals. For example, an alternative preferred embodiment of the present invention the aperture function Y(x) has the form of $\sin^2(x)$. For example, the upper edge of electrode 53 is defined by the aperture function set out in Equation 3 below:

$$Y(x) = \frac{H}{2}\left[1 + \frac{R-1}{R}\left(\frac{\pi}{3}*\sin^2\left(\frac{\pi*x}{L} + \frac{3*\pi}{4}\right) - \left(\frac{\pi}{6} + \frac{x}{L}\right)\right)\right] \quad \text{Equation 3}$$

The lower edge of electrode 53 is a mirror image of the upper edge of electrode 53. Thus, the lower edge of electrode 53 is defined by the aperture function set out in Equation 4 below:

$$Y(x) = (-1)\frac{H}{2}\left[1 + \frac{R-1}{R}\left(\frac{\pi}{3}*\sin^2\left(\frac{\pi*x}{L} + \frac{3*\pi}{4}\right) - \left(\frac{\pi}{6} + \frac{x}{L}\right)\right)\right] \quad \text{Equation 4}$$

In essence, an aperture function is optimal provided it satisfies certain criteria. First, the electrode is apodized. Additionally, the aperture produces an edge with soft edges (i.e. has no points of discontinuity). Also, the area centroid of the electrode occurs at the midpoint of the interaction length of the electrode. The last two discussed criteria are satisfied when an aperture function Y(x) satisfies the following equation 5:

$$\frac{\int_0^L Y(x) * x dx}{\int_0^L Y(x) * dx} = \frac{L}{2} \quad \text{Equation 5}$$

Additional positive features includes having a form where the apodization ratio can be increased to infinity. Also it is beneficial when the electrode can be nested in an array of electrodes and each electrode in the array can be driven from either side by a single-ended electrical interconnect without affecting the sum of radiated acoustic energy from the array. As will be understood by practitioners in the art, there are many possible aperture functions which satisfy all these criteria in addition to the examples of the aperture functions Y(x) given above.

What is claimed is:

1. An acousto-optical device comprising:
    an acousto-optical crystal through which light travels along a first axis; and
    a plurality of electrodes positioned along a second axis substantially perpendicular to the first axis, each electrode having
        an interaction length along the first axis,
        an apodization ratio greater than one along a direction parallel to the interaction length of the electrode, and
        a top edge defined by an aperture function Y(x) wherein x is a distance along the interaction length and the aperture function Y(x) is asymmetric about a midpoint of the interaction length of the electrode.

2. A device as in claim 1 wherein the plurality of electrodes is a nested array of electrodes.

3. A device as in claim 2 wherein the aperture function Y(x) defines the top edge so that if the apodization ratio is infinity, the electrode can be driven from either half of the interconnect substantially without affecting the sum of radiated acoustic energy from the array of electrodes.

4. A device as in claim 1 wherein when L represents the interaction length of an aperture, the aperture function Y(x) satisfies the following equation:

$$\frac{\int_0^L Y(x) * x dx}{\int_0^L Y(x) * dx} = \frac{L}{2}.$$

5. A device as in claim 1 wherein when L represents the interaction length of an aperture, H represents a maximum height of the electrode and R represents the apodization ratio, the aperture function Y(x) is as is defined by the following equation:

$$Y(x) = \frac{H}{2}\left[1 - \frac{R-1}{R*L}\left(x + \frac{\pi*L}{6} * \sin\left(\frac{2\pi*x}{L}\right)\right)\right].$$

6. A device as in claim 1 wherein when L represents the interaction length of an aperture, H represents a maximum height of the electrode and R represents the apodization ratio, the aperture function Y(x) is defined by the following equation:

$$Y(x) = \frac{H}{2}\left[1 + \frac{R-1}{R}\left(\frac{\pi}{3} * \sin^2\left(\frac{\pi*x}{L} + \frac{3*\pi}{4}\right) - \left(\frac{\pi}{6} + \frac{x}{L}\right)\right)\right].$$

7. A device as in claim 1 wherein the electrode has a bottom edge defined by an aperture function −Y(x).

8. A device as in claim 7 wherein when L represents the interaction length of an aperture, H represents a maximum height of the electrode and R represents the apodization ratio, the aperture function Y(x) for the top edge is defined by the following equation:

$$Y(x) = \frac{H}{2}\left[1 - \frac{R-1}{R*L}\left(x + \frac{\pi*L}{6} * \sin\left(\frac{2\pi*x}{L}\right)\right)\right]$$

and the aperture function −Y(x) for the bottom edge is defined by the following equation:

$$Y(x) = (-1)\frac{H}{2}\left[1 - \frac{R-1}{R*L}\left(x + \frac{\pi*L}{6} * \sin\left(\frac{2\pi*x}{L}\right)\right)\right].$$

9. A device as in claim 7 wherein when L represents the interaction length of an aperture, H represents a maximum height of the electrode and R represents the apodization ratio, the aperture function Y(x) is defined by the following equation:

$$Y(x) = \frac{H}{2}\left[1 - \frac{R-1}{R}\left(\frac{\pi}{3} * \sin^2\left(\frac{\pi*x}{L} + \frac{3*\pi}{4}\right) - \left(\frac{\pi}{6} + \frac{x}{L}\right)\right)\right].$$

and the aperture function −Y(x) for the bottom edge is defined by the following equation:

$$Y(x) = (-1)\frac{H}{2}\left[1 - \frac{R-1}{R}\left(\frac{\pi}{3} * \sin^2\left(\frac{\pi*x}{L} + \frac{3*\pi}{4}\right) - \left(\frac{\pi}{6} + \frac{x}{L}\right)\right)\right].$$

10. The device of claim 1 wherein the aperture function Y(x) has no points of discontinuity along the interaction length of the electrode.

11. The device of claim 10 wherein a first derivative of the aperture function Y(x) has no points of discontinuity along the interaction length of the electrode.

12. The device of claim 11 wherein a second derivative of the aperture function Y(x) has no points of discontinuity along the interaction length of the electrode.

13. The device of claim 1 wherein each electrode has an area centroid at the midpoint of the interaction length of the electrode.

14. An acousto-optic device comprising:
    an acousto-optical crystal through which light travels along a first axis; and
    a plurality of electrodes positioned along a second axis substantially perpendicular to the first axis, each electrode having
        an interaction length along the first axis,
        an apodization ratio greater than one along a direction parallel to an interaction length of the electrode,
        a top edge defined by an aperture function Y(x) wherein x is a distance along the interaction length and the aperture function Y(x) and a first derivative of the aperture function Y(x) have no points of discontinuity along the interaction length of the electrode, and
        an area centroid at a midpoint of the interaction length of the electrode.

15. An acousto-optic device as in claim 14 wherein when L represents the interaction length of an aperture, H represents a maximum height of the electrode and R represents the apodization ratio, the aperture function Y(x) is as is defined by the following equation:

$$Y(x) = \frac{H}{2}\left[1 - \frac{R-1}{R*L}\left(x + \frac{\pi*L}{6}*\sin\left(\frac{2\pi*x}{L}\right)\right)\right].$$

16. An acousto-optic device as in claim 14 wherein when L represents the interaction length of an aperture, H represents a maximum height of the electrode and R represents the apodization ratio, the aperture function Y(x) is defined by the following equation:

$$Y(x) = \frac{H}{2}\left[1 + \frac{R-1}{R}\left(\frac{\pi}{3}*\sin^2\left(\frac{\pi*x}{L} + \frac{3*\pi}{4}\right) - \left(\frac{\pi}{6} + \frac{x}{L}\right)\right)\right]$$

17. An acousto-optic device as in claim 14 wherein the electrode has a bottom edge defined by an aperture function −Y(x).

18. An acousto-optic device as in claim 17 wherein when L represents the interaction length of an aperture, H represents a maximum height of the electrode and R represents the apodization ratio, the aperture function Y(x) for the top edge is defined by the following equation:

$$Y(x) = \frac{H}{2}\left[1 - \frac{R-1}{R*L}\left(x + \frac{\pi*L}{6}*\sin\left(\frac{2\pi*x}{L}\right)\right)\right], \text{ and}$$

the aperture function −Y(x) for the bottom edge is defined by the following equation:

$$Y(x) = (-1)\frac{H}{2}\left[1 - \frac{R-1}{R*L}\left(x + \frac{\pi*L}{6}*\sin\left(\frac{2\pi*x}{L}\right)\right)\right]$$

19. An acousto-optic device as in claim 17 wherein when L represents the interaction length of an aperture, H represents a maximum height of the electrode and R represents the apodization ratio, the aperture function Y(x) is defined by the following equation:

$$Y(x) = \frac{H}{2}\left[1 + \frac{R-1}{R}\left(\frac{\pi}{3}*\sin^2\left(\frac{\pi*x}{L} + \frac{3*\pi}{4}\right) - \left(\frac{\pi}{6} + \frac{x}{L}\right)\right)\right], \text{ and}$$

the aperture function −Y(x) for the bottom edge is defined by the following equation:

$$Y(x) = (-1)\frac{H}{2}\left[1 + \frac{R-1}{R}\left(\frac{\pi}{3}*\sin^2\left(\frac{\pi*x}{L} + \frac{3*\pi}{4}\right) - \left(\frac{\pi}{6} + \frac{x}{L}\right)\right)\right]$$

20. An acousto-optic device as in claim 14 wherein when L represents the interaction length of an aperture, the aperture function Y(x) satisfies the following equation:

$$\frac{\int_0^L Y(x)*x\,dx}{\int_0^L Y(x)*dx} = \frac{L}{2}.$$

21. The device of claim 14 wherein a second derivative of the aperture function Y(x) has no points of discontinuity along the interaction length of the electrode.

22. The device of claim 14 wherein the aperture function Y(x) is asymmetric about a midpoint of the interaction length of the electrode.

23. An acousto-optic device as in claim 14 wherein the plurality of electrodes are nested in an array of electrodes.

24. An acousto-optic device as in claim 23 wherein the aperture function Y(x) defines the top edge so that if the apodization ratio is infinity, the electrode can be driven from either half of the interconnect substantially without affecting the sum of radiated acoustic energy from the array of electrodes.

25. An acousto-optical device comprising:
an acousto-optical crystal through which light travels along a first axis; and
a plurality of electrodes having a single shape, the plurality of electrodes positioned along a second axis substantially perpendicular to the first axis, each electrode having
an interaction length along the first axis, and
an apodization ratio greater than one along a direction parallel to the interaction length of the electrode, and
a first edge that runs substantially adjacent the entire length of a second edge of another electrode from the plurality of electrodes.

* * * * *

UNITED STATES PATENT AND TRADEMARK OFFICE
CERTIFICATE OF CORRECTION

PATENT NO.    : 6,236,492 B1
DATED         : May 22, 2001
INVENTOR(S)   : John D. Kump It is certified that error appears in the above-identified patent and that said Letters Patent is hereby corrected as shown below:

<u>Title page,</u>
Change "Crystal Corporation" to -- Crystal Technology, Inc. --

Signed and Sealed this

Twenty-second Day of January, 2002

Attest:

JAMES E. ROGAN
*Attesting Officer*    *Director of the United States Patent and Trademark Office*